United States Patent
Souchard et al.

(10) Patent No.: US 6,429,161 B1
(45) Date of Patent: Aug. 6, 2002

(54) CATALYTIC PORCELAIN ENAMEL COATING COMPOSITION

(75) Inventors: Thierry Souchard, Moeslains; Alain Aronica, Saint Dizier, both of (FR)

(73) Assignee: Ferro France S.A.R.L., Saint Dizier Cedex (FR)

( * ) Notice: Subject to any disclaimer, the term of this patent is extended or adjusted under 35 U.S.C. 154(b) by 0 days.

(21) Appl. No.: 09/582,078

(22) PCT Filed: Jan. 8, 1999

(86) PCT No.: PCT/EP99/00077
§ 371 (c)(1),
(2), (4) Date: Aug. 7, 2000

(87) PCT Pub. No.: WO99/35101
PCT Pub. Date: Jul. 15, 1999

(30) Foreign Application Priority Data

Jan. 12, 1998 (EP) .............................. 98100359

(51) Int. Cl.$^7$ ............................ C03C 8/16; C03C 3/083; C03C 3/068
(52) U.S. Cl. .............................. 501/17; 501/20; 501/21; 501/68; 501/78
(58) Field of Search .................... 501/17, 20, 21, 501/14, 64, 68, 78, 73

(56) References Cited

U.S. PATENT DOCUMENTS

| | | | |
|---|---|---|---|
| 2,909,438 A | | 10/1959 | Kautz .......................... 106/48 |
| 3,671,278 A | | 6/1972 | Borowski .................... 106/48 |
| 3,742,930 A | * | 7/1973 | Ott |
| 3,759,240 A | * | 9/1973 | Borowski |
| 4,084,975 A | * | 4/1978 | Faust |
| 4,147,835 A | | 4/1979 | Nishino et al. ............. 428/450 |
| 4,204,021 A | | 5/1980 | Becker ....................... 428/325 |
| 4,221,824 A | * | 9/1980 | Leonard et al. |
| 4,361,654 A | * | 11/1982 | Ohmura et al. |
| 4,460,630 A | | 7/1984 | Nishino et al. .......... 427/376.2 |
| RE31,843 E | * | 3/1985 | Noble et al. |
| 4,847,218 A | * | 7/1989 | Schittenhelm et al. |
| 5,075,263 A | * | 12/1991 | Schittenhelm et al. |
| 5,198,393 A | * | 3/1993 | Grebe et al. |
| 5,266,357 A | * | 11/1993 | Preuss et al. |
| 5,296,415 A | * | 3/1994 | Podesta |
| 5,382,552 A | | 1/1995 | Saad et al. ..................... 501/25 |
| 5,385,871 A | * | 1/1995 | Nigrin et al. |
| 5,605,869 A | * | 2/1997 | Mangat et al. |
| 5,891,524 A | * | 4/1999 | Erukulla |
| 5,998,037 A | * | 12/1999 | Sridharan et al. |
| 6,001,494 A | * | 12/1999 | Kuchinski et al. |
| 6,087,438 A | * | 7/2000 | Herber et al. |
| 6,171,383 B1 | * | 1/2001 | Sakoske et al. |
| 6,177,201 B1 | * | 1/2001 | Wallace et al. |
| 6,221,147 B1 | * | 4/2001 | Sakoske et al. |

FOREIGN PATENT DOCUMENTS

| | | |
|---|---|---|
| DE | 4200237 A1 | 7/1993 |
| DE | 19654077 A1 | 6/1998 |
| EP | 0931772 A1 | 7/1999 |

OTHER PUBLICATIONS

Wieczorek et al., "Self–cleaning enamels for electric ranges," 6001 Chemical Abstracts, 113 (1990) Dec. 10, No. 24, Columbus, Ohio.

Bulavin, "Bonding Activators In Leadless Silicate Enamels For Aluminum," pp. 324–326, UDC666.293, translated from Steklo i Keramika, vol. 22, No. 5, pp. 32,35, May 1965.

* cited by examiner

*Primary Examiner*—Tom Dunn
*Assistant Examiner*—Colleen P. Cooke
(74) *Attorney, Agent, or Firm*—Rankin, Hill, Porter & Clark LLP

(57) ABSTRACT

The present invention provides a new and improved porcelain enamel coating composition for use in forming a self-cleanable coating upon aluminized steel. The coating composition comprises a glass component having a composition comprising from about 30% to about 55% $SiO_2$, from about 11% to about 20% $TiO_2$, from about 0% to about 10% $B_2O_3$, from about 20% to about 40% alkali metal oxides, less than about 5% rare earth metal oxides, from about 0% to about 10% CaO, from about 0% to about 10% BaO, from about 0% to about 10% MnO, from about 2% to about 12% CuO, from about 0% to about 10% $Sb_2O_3$, from about 1.5% to about 10% $Fe_2O_3$, from about 0% to about 10% $SnO_2$, from about 0% to about 10% $P_2O_5$, less than about 2% $MoO_3$, and less than about 5% $V_2O_5$.

9 Claims, No Drawings

CATALYTIC PORCELAIN ENAMEL COATING COMPOSITION

FIELD OF INVENTION

The invention concerns a coating composition for use in forming a catalytic porcelain enamel coating on food related devices such as, for example, ovens and microwave cooking devices. More particularly, the present invention concerns a new porcelain enamel coating composition for use on aluminized steel that displays excellent self-cleanability.

BACKGROUND OF INVENTION

In certain food related applications, such as the walls of food cooking ovens, it is advantageous to have a coating on the inside of the oven cavity that affords easy cleaning. Unfortunately, however, most porcelain enamel coating materials exhibit characteristics which are not ideal from the standpoint of cleanability. The prior art does provide porcelain enamel compositions that afford improved cleanability. Examples of such compositions may be found in Saad et al. U.S. Pat. No. 5,382,552 and Becker et al. U.S. Pat. No. 4,204,021. However, such compositions are intended primarily for use upon a plain steel substrate.

In many food related applications, aluminized steel is employed. Nishino et al. U.S. Pat. No. 4,460,630 discloses a porcelain enamel coating system for use on aluminized steel that exhibits improved cleanability. However, the system of the '630 patent is a two-coat system.

SUMMARY OF INVENTION

The present invention provides a new and improved porcelain enamel coating composition for use on aluminized steel that may be applied dry as a single coat and it also affords a high degree of cleanability. The coating composition of the present invention is especially well-suited for use in connection with cookware applications. No degreasing of the aluminized steel is required prior to the application of the enamel composition.

In a preferred embodiment the porcelain enamel coating material of the present invention comprises a glass component and one or more mill additions. The glass component includes a composition by weight from about 30% to about 55% $SiO_2$, from about 11% to about 20% $TiO_2$, from about 0% to about 10% $B_2O_3$, from about 20% to about 40% alkali metal oxides, less than about 5% rare earth metal oxides, from about 0% to about 10% CaO, from about 0% to about 10% BaO, from about 0% to about 10% MnO, from about 2% to about 12% CuO, from about 0% to about 10% $Sb_2O_3$, from about 1.5% to about 10% $Fe_2O_3$, from about 0% to about 10% $SnO_2$, from about 0% to about 10% $P_2O_5$, less than about 2% $MoO_3$, and less than about 5% $V_2O_5$. The glass component may comprise one or more glass frits so as to provide this overall stated composition.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION

The novel porcelain enamel composition of the present invention is a significant improvement over prior art compositions because it can be applied to aluminized steel by dry electrostatic spraying and it exhibits excellent cleanability well beyond six (6) cycles (i.e., more than six cycles of heating, cooking and cleaning of burnt-on food from the surface consistent with ISO 8291).

The porcelain enamel composition comprises from about 80% to about 99.9% by weight of the glass component and from about 0.1% to about 20% mill additions. The glass component provides a composition as follows:

| Oxide | Weight % | Preferred Weight |
|---|---|---|
| BaO | 0–10 | 0–8 |
| $B_2O_3$ | 0–10 | 0–8 |
| CaO | 0–10 | 0–8 |
| CuO | 2–12 | 2–10 |
| $Sb_2O_3$ | 0–10 | 0–8 |
| $Fe_2O_3$ | 1.5–10 | 2–9 |
| $SnO_2$ | 0–10 | 0–8 |
| $SiO_2$ | 30–55 | 30–55 |
| $TiO_2$ | 11–20 | 11–20 |
| $P_2O_5$ | 0–10 | 0–8 |
| Rare earth oxides | 0–5 | 0–2 |
| Alkali metal oxides | 20–40 | 20–40 |
| MnO | 0–10 | 0–8 |
| $MoO_3$ | 0–2 | 0–1 |
| $V_2O_5$ | 0–5 | |

The alkali metal oxides include one or more oxides of lithium, sodium, potassium, rubidium and cesium. The rare earth oxides include one or more oxides of the lanthanoids and yttrium and scandium. Generally, the rare earth oxides comprise CeO.

The enamel compositions according to the present invention are suitable for application to a substrate using conventional dry application techniques such as, for example, a standard corona charging gun. Dry application techniques are well-known and discussed in U.S. Pat. Nos. 4,110,487 and 3,928,668. The disclosures of the '487 and '668 patents are incorporated herein by reference for their teachings relative to the dry or electrostatic application of porcelain enamel coating compositions.

The coating composition of the present invention may be applied directly to the metal substrate without the need of a ground coat or bonding coat. In general, the coating composition may be applied at a rate of 25 to 80 grams per square foot so as to provide a coating thickness of from about 3 to about 10 mils subsequent to firing.

Articles that have been coated with the coating composition of the present invention may be fired in a conventional manner using conventional firing equipment. Firing is generally conducted at a temperature of 500° C. to about 650° C. for a period of about 4 to about 13 minutes. Of course, the specific desired temperature for firing will be a function of the grade of aluminized steel employed and the exact composition of the enamel.

The glass frit or frits that comprise the glass component may be prepared utilizing conventional glass melting techniques. A conventional ceramic refractory, fused silica or platinum crucible may be used to prepare the glass frit, molten glass being formed in the crucible and then converted to glass frit using water-cooled rollers and milling equipment. It will be appreciated that the step of producing the glass frits is not per se critical and any of the various techniques well-known to those skilled in the art can be employed.

It will be appreciated that the glass component is used in combination with various mill additions. It will also be appreciated that the mill additions will vary depending upon the specific application conditions being utilized. For dry applications (electrostatic), the glass component is used in combination with one or more conventional organopolysiloxanes. Such organopolysiloxanes are commonly employed in enamel compositions that are designed for dry application. Although the coating composition is intended primarily for dry application, it will be appreciated that for electrophoretic applications and other wet application processes such as spraying and dipping, the glass frits used may be milled in conjunction with other mill additions such as quartz, bentonite, etc. to produce a suitable composition. As is well-known in the enamel art, there is a wide range of other acceptable mill agents or components that may also be utilized in the present invention to produce the desired resultant product.

The resultant product preferably provides a coarseness of 4% by weight through a 325 mesh sieve (45 μmicrons). Fortunately, the milling fineness can be altered without a significant impact on the final coating.

The following examples are intended only to illustrate the invention and should not be construed as imposing limitations upon the claims.

EXAMPLE I

A frit composition having the following compositions was prepared using conventional glass melting techniques.

| Oxide | Weight Percent |
| --- | --- |
| $B_2O_3$ | 1.30 |
| CaO | 0.16 |
| $K_2O$ | 8.14 |
| $Na_2O$ | 15.65 |
| $Sb_2O_3$ | 1.70 |
| $P_2O_5$ | 1.77 |
| $Li_2O$ | 3.74 |
| $Fe_2O_3$ | 3.20 |
| $SiO_2$ | 40.30 |
| BaO | 1.32 |
| $TiO_2$ | 14.50 |
| $SnO_2$ | 1.52 |
| MnO | 2.32 |
| CuO | 3.95 |
| Total | 100.00 |

EXAMPLE II

A porcelain enamel coating composition was prepared using the glass frit of Example I to provide the composition set forth below. The components were ground in a ball mill in a conventional manner until a coarseness of 4% by weight was retained on a 325 mesh screen.

| Component | % Parts By Weight |
| --- | --- |
| Frit Example I | 100 |
| Hydrogenmethyl polysiloxane | 0.25 |
| Dimethyl polysiloxane | 0.03 |

EXAMPLE III

The enamel composition of Example II was applied on non-degreased aluminized steel with a dry application of 50 grams per square foot using a Corona discharge gun with a voltage of 70 kv. The coated sample was then fired at about 560° C. for 8 minutes in an air convection furnace. The sample displayed excellent hardness and good porosity as is required for a good catalytic coating. Powder adhesion after 10 minutes was greater than 60%. Cleanability was excellent even after six (6) cycles.

While the invention had been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

What is claimed:

1. A porcelain enamel coating composition comprising a glass composition comprising by weight from about 30% to about 55% $SiO_2$, from about 11% to about 20% $TiO_2$, from about 0% to about 10% $B_2O_3$, from about 20% to about 40% alkali metal oxides, less than about 5% rare earth metal oxides, from about 0% to about 10% CaO, from about 0% to about 10% BaO, from about 0% to about 10% MnO, from about 2% to about 12% CuO, from about 0% to about 10% $Sb_2O_3$, from about 1.5% to about 10% $Fe_2O_3$, from about 0% to about 10% $SnO_2$, from about 0% to about 10% $P_2O_5$, less than about 2% $MoO_3$, and less than about 5% $V_2O_5$, said composition when fired on aluminized steel forming a porous coating layer that exhibits cleanability beyond six cycles in compliance with ISO 8291.

2. A porcelain enamel coating composition as set forth in claim 1 comprising from about 80% to about 99.9% by weight said glass composition and from about 0.01% to about 20% by weight mill additions.

3. A porcelain enamel coating composition as set forth in claim 2 wherein said mill additions comprise organopolysiloxane.

4. A porcelain enamel coating composition as set forth in claim 1 wherein said glass composition comprises from about 30% to about 55% $SiO_2$, from about 11% to about 20% $TiO_2$, from about 0% to about 8% $B_2O_3$, from about 20% to about 40% alkali metal oxides, from about 0% to about 2% rare earth metal oxides, from about 0% to about 8% CaO, from about 0% to about 8% BaO, from about 0% to about 8% MnO, from about 2% to about 10% CuO, from about 0% to about 8% $Sb_2O_3$, from about 2% to about 9% $Fe_2O_3$, from about 0% to about 8% $SnO_2$, from about 0% to about 8% $P_2O_5$, and less than about 1% $MoO_3$.

5. A section of aluminized steel having disposed thereon a coating layer, said coating layer formed by firing a composition comprising a porcelain enamel coating composition as defined in claim 1.

6. A method of producing a coated section of aluminized steel comprising:
  i) providing a section of aluminized steel;
  ii) applying a porcelain enamel coating composition to said aluminized steel, said porcelain enamel coating composition comprising a glass component comprising by weight from about 30% to about 55% $SiO_2$, from about 11% to about 20% $TiO_2$, from about 0% to about 10% $B_2O_3$, from about 20% to about 40% alkali metal oxides, less than about 5% rare earth metal oxides, from about 0% to about 10% CaO, from about 0% to about 10% BaO, from about 0% to about 10% MnO, from about 2% to about 12% CuO, from about 0% to about 10% $Sb_2O_3$, from about 1.5% to about 10% $Fe_2O_3$, from about 0% to about 10% $SnO_2$, from about 0% to about 10% $P_2O_5$, less than about 2% $MoO_3$, and less than about 5% $V_2O_5$; and iii) firing said section of aluminized steel so as to provide a porous enamel coating layer on said section of aluminized steel that exhibits cleanability beyond six cycles in compliance with ISO 8291.

7. A method as set forth in claim 6 wherein said step of firing said aluminized steel comprises firing said aluminized steel at a temperature of from about 500° to about 600° C.

8. A method as set forth in claim 6 wherein said porcelain enamel composition is electrostatically applied.

9. A method as set forth in claim 8 wherein said coating composition comprises by weight from about from about 30% to about 55% $SiO_2$, from about 11% to about 20% $TiO_2$, from about 0% to about 8% $B_2O_3$, from about 20% to about 40% alkali metal oxides, from about 0% to about 2% rare earth metal oxides, from about 0% to about 8% CaO, from about 0% to about 8% BaO, from about 0% to about 8% MnO, from about 2% to about 10% CuO, from about 0% to about 8% $Sb_2O_3$, from about 2% to about 9% $Fe_2O_3$, from about 0% to about 8% $SnO_2$, from about 0% to about 8% $P_2O_5$, and less than about 1% $MoO_3$.

* * * * *